US012621855B2

(12) United States Patent
Wang et al.

(10) Patent No.: US 12,621,855 B2
(45) Date of Patent: May 5, 2026

(54) SYSTEM AND METHOD FOR SIDELINK COMMUNICATIONS IN WIRELESS COMMUNICATION NETWORKS

(71) Applicant: ZTE CORPORATION, Shenzhen (CN)

(72) Inventors: Mengzhen Wang, Shenzhen (CN); Lin Chen, Shenzhen (CN); Boyuan Zhang, Shenzhen (CN); Xueying Diao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 345 days.

(21) Appl. No.: 17/738,831

(22) Filed: May 6, 2022

(65) Prior Publication Data

US 2023/0015755 A1     Jan. 19, 2023

Related U.S. Application Data

(63) Continuation of application No. PCT/CN2019/116194, filed on Nov. 7, 2019.

(51) Int. Cl.
*H04W 72/54* (2023.01)
*H04W 72/20* (2023.01)
(Continued)

(52) U.S. Cl.
CPC ........... *H04W 72/54* (2023.01); *H04W 72/20* (2023.01); *H04W 76/11* (2018.02); *H04W 76/18* (2018.02); *H04W 76/19* (2018.02)

(58) Field of Classification Search
CPC ..... H04W 72/54; H04W 72/20; H04W 76/18; H04W 76/19; H04W 76/11; H04W 76/27;
(Continued)

(56) References Cited

U.S. PATENT DOCUMENTS

2018/0255499 A1     9/2018   Loehr et al.
2019/0261450 A1     8/2019   Adachi et al.
(Continued)

FOREIGN PATENT DOCUMENTS

CN        110166976  A       8/2019
EP            3829198  B1  *  7/2024    ........... H04L 1/0005
(Continued)

OTHER PUBLICATIONS

Huawei, HiSilicon, Further discussion on the coexistence of R14 UEs and R15 UEs, 3GPP TSG-RAN WG2 Meeting #102, R2-1807430, Busan, Korea, May 21-25, 2018 (Year: 2018).*
(Continued)

*Primary Examiner* — Mounir Moutaouakil
(74) *Attorney, Agent, or Firm* — Foley & Lardner LLP

(57) ABSTRACT

Systems and methods for communication between a wireless communication devices and wireless communication nodes disclosed herein. In one embodiment, the systems and methods are configured to determine, by a wireless communication node, an indication of a version of a sidelink transmission format. The wireless communication node can further configure, according to the indication, a sidelink resource and at least one transmission configuration parameter for a sidelink transmission of a wireless communication device.

20 Claims, 9 Drawing Sheets

(51) Int. Cl.
　　H04W 76/11　　　　(2018.01)
　　H04W 76/18　　　　(2018.01)
　　H04W 76/19　　　　(2018.01)

(58) Field of Classification Search
　　CPC ..... H04W 88/085; H04W 76/14; H04W 4/06;
　　　　　　H04W 4/40; H04W 28/0215; H04W
　　　　　　　　　　　　28/0263; H04W 92/18
　　See application file for complete search history.

(56) References Cited

U.S. PATENT DOCUMENTS

| | | | | |
|---|---|---|---|---|
| 2019/0306923 | A1* | 10/2019 | Xiong | H04L 27/261 |
| 2019/0313359 | A1* | 10/2019 | Lee | H04W 76/14 |
| 2019/0320475 | A1* | 10/2019 | Li | H04W 72/121 |
| 2020/0053675 | A1* | 2/2020 | Khoryaev | H04L 5/001 |
| 2020/0106566 | A1* | 4/2020 | Yeo | H04L 1/1854 |
| 2020/0275458 | A1* | 8/2020 | Khoryaev | H04W 72/12 |
| 2020/0288432 | A1* | 9/2020 | Min | H04W 4/40 |
| 2020/0329352 | A1* | 10/2020 | Wang | H04L 67/12 |
| 2021/0160849 | A1* | 5/2021 | Sun | H04W 72/046 |
| 2022/0286826 | A1 | 9/2022 | Wang et al. | |

FOREIGN PATENT DOCUMENTS

| | | |
|---|---|---|
| WO | WO-2019/049348 A1 | 3/2019 |
| WO | WO-2019/153935 A1 | 8/2019 |

OTHER PUBLICATIONS

ZTE Corporation, Considerations on Tx profile and transmission format, ZTE3GPP TSG RAN WG2 Meeting #102 R2-1806753 Busan, Korea, May 21-25, 2018 (Year: 2018).*

Ericsson; "Summary of email discussion"; 3GPP TSG-RAN WG2 #107bis; R2-1913328; Oct. 14-18, 2019; 26 Pages; Chongqing, China.

International Search Report and Written Opinion for PCT Appl. No. PCT/CN2019/116194 mailed Jun. 23, 2020(8 pages).

ZTE Corporation "Considerations on Tx profile and transmission format"; 3GPP TSG RAN WG2 Meeting #102; R2-1806753; May 21-25, 2018; 3 Pages; Busan, Korea.

ZTE Corporation et al.; "SLRB maintenance during RRC states transition"; 3GPP TSG RAN WG2 Meeting #107bis; R2-1912391; Oct. 14-18, 2019; 3 pages; Chongqing, China.

First Office Action for CN Appl. No. 201980102020.0, dated Jun. 20, 2024 (with English translation, 19 pages).

Nokia et al., "Addition of RAN specific Access Category", 3GPP TSG-RAN WG2 Meeting #103bis, R2-1813644, Oct. 12, 2018, Chengdu, China (6 pages).

Nokia et al., "Addition of RAN specific Access Category", 3GPP TSG-RAN WG2 Meeting #103bis, R2-1815990, Oct. 12, 2018, Chengdu, China (135 pages).

Extended European Search Report for EP Appl. No. 19951356.5 dated Mar. 30, 2023 (14 pages).

ZTE, Sanechips: "F1 impact to support NR V2X," 3GPP TSG RAN WG2 Meeting #105bis, R3-195700, Oct. 14-18, 2019, Chongqing, China (6 pages).

Lg Electronics, et al. "Conclusion on KI#2," SA WG2 Meeting #129bis; S2-1811964; Nov. 26-30, 2018; West Palm Beach, USA (4 pages).

Notice of Allowance for JP App. No. 2022-526437 dated Nov. 10, 2023 (no translation available, 4 pages).

First Office Action for JP Appl. No. 2022-526437, dated Aug. 1, 2023 (with English translation, 9 pages).

Huawei et al., "Further discussion on the coexistence of R14 UEs and R15 UEs", 3GPP TSG-RAN WG2 Meeting #102, R2-1807430, May 25, 2018, Busan, Korea (6 pages).

LG Electronics et al., "Clarification on precedence of parameters", 3GPP TSG-SA WG2 Meeting #135, S2-1910777, Oct. 18, 2019, Split, Croatia (10 pages).

CATT, "Support of PC5 Qos Parameters for NR V2X in NG-AP," 3GPP TSG-RAN3 Meeting #105bis; R3-195359; Change Request 38.413, version 15.4.0; Chongqing, China; Oct. 14-18, 2019 (36 pages).

LG Electronics Inc., Issues on F1 for support of sidelink resource mode 1 and 2, 3GPP TSG-RAN WG3 Meeting #105bis; R3-195538; Chongqing, China; Oct. 14-18, 2019 (5 pages).

Office Action for KR App. No. 10-2022-7019195 dated Jan. 23, 2025 (with English translation, 7 pages).

Communication pursuant to Article 94(3) EPC for EP Appl. No. 19951356.5, dated Sep. 22, 2025 (10 pages).

Office Action for KR Appl. No. 10-2022-7019195, dated Sep. 10, 2025 (with English translation, 6 pages).

* cited by examiner

SYSTEM AND METHOD FOR SIDELINK COMMUNICATIONS IN WIRELESS COMMUNICATION NETWORKS

CROSS-REFERENCE TO RELATED APPLICATION

This application claims the benefit of priority under 35 U.S.C. § 120 as a continuation of PCT Patent Application No. PCT/CN2019/116194, filed on Nov. 7, 2019, the disclosure of which is incorporated herein by reference in its entirety.

TECHNICAL FIELD

The disclosure relates generally to wireless communications and, more particularly, to systems and methods for wireless communications involving mobile platforms such as vehicles.

BACKGROUND

Wireless communication networks can include network communication devices, network communication nodes, and at least one core network associated with the wireless network. In some instances, the network communication devices can include vehicles that are capable of carrying out wireless communications.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method performed by a wireless communication node (e.g., a base station) includes determining an indication (e.g., Tx profile or transmission format) of a version of a sidelink transmission format. The method further includes configuring, according to the indication, a sidelink resource and at least one transmission configuration parameter for a sidelink transmission of a wireless communication device (e.g., a UE).

In another embodiment, a method performed by a wireless communication device includes transitioning from a first radio resource control (RRC) state during which a first sidelink transmission is initiated, to a second RRC state. The method further includes using a mapping of a PC5 quality of service (QoS) flow to a sidelink radio bearer (SLRB), in a SLRB configuration of the second RRC state, to continue with the first sidelink transmission.

In another embodiment, a method performed by a wireless communication device (e.g., a UE) includes receiving a radio resource control (RRC) reconfiguration message including a sidelink radio bearer configuration from a wireless communication node (e.g., a base station). The method further includes sending, to the wireless communication node, failure information about the sidelink radio bearer configuration.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solutions are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
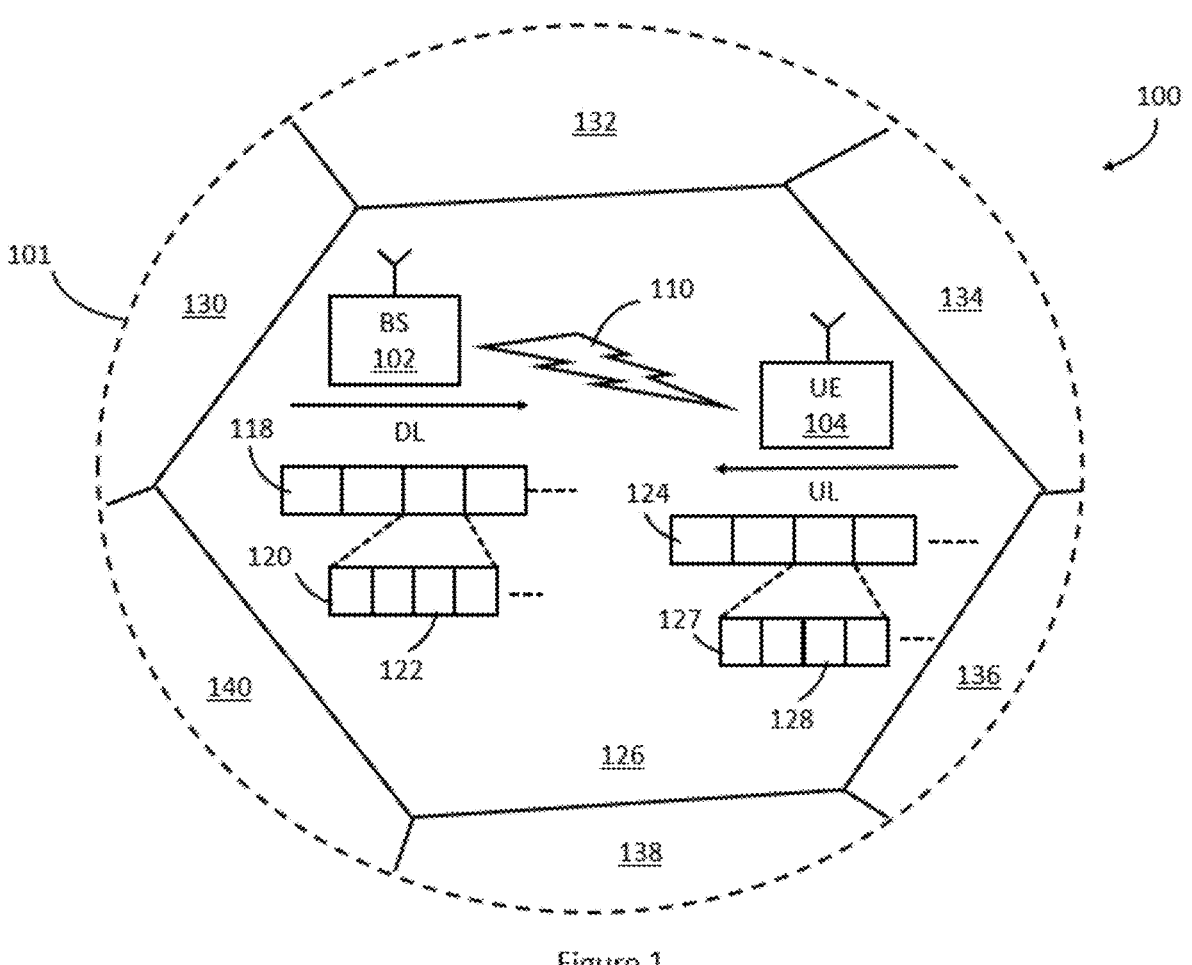
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
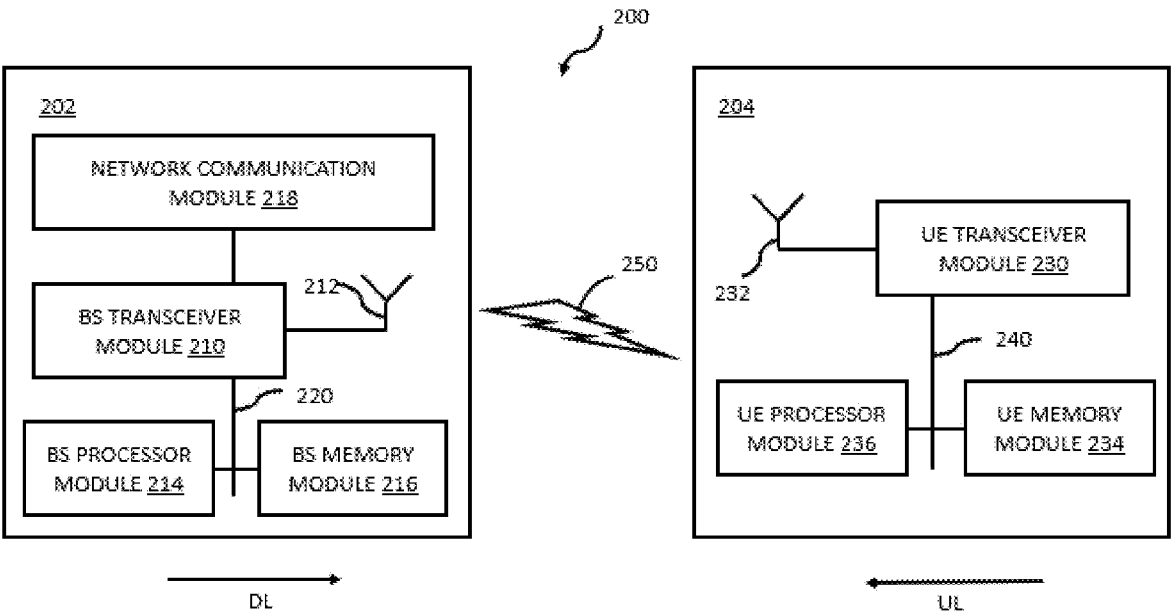
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

In NR (new radio) vehicle-to-any wireless device (V2X) communication, cross-RAT (radio access technology) SL (sidelink) resources scheduling/allocation is supported. The cross RAT SL resources scheduling includes: NR Uu (radio interface) that controls LTE SL resource scheduling, and LTE Uu that controls NR SL resource scheduling. NR Uu is an interface for cellular communication in the NR RAT between the device and a base station (for example, as defined in 3GPP TS 38.300). NR Uu supports uplink unicast communication from device to base station as well as downlink unicast or groupcast communication from base station to the device. Similarly, LTE Uu is an interface for cellular communications in the LTE RAT between device and base station (for example, as defined in 3GPP TR 21.905). LTE V2X SL communication supports two transmission modes: the R14 format transmission and the R15 format transmission. In the R14 format transmission, the last symbol of the Physical Sidelink Control Channel (PSSCH) uses puncturing, using the R14 Modulation Coding Scheme (MCS) table. In the R15 format transmission, the last symbol of PSSCH uses rate-matching, using R15 MCS table, and supports 64QAM (quadrature amplitude modulation). Because of the difference between LTE and NR, or for that matter between any two different RATs, the base station need to determine whether a SL resource request received from the UE is for an LTE SL resource or for an NR SL resource. Further, the NR base station needs to determine whether to configure LTE R14 format or the R15 format transmission parameter. Further, in instances where the base station's logical architecture is split between a Central Unit (CU) and a Distributed Unit (DU), gNB-DU may have to determine whether the UE is requesting the LTE SL resource or the NR SL resource, and whether to configure LTE R14 format or R15 format transmission parameters for sidelink transmission.

Internet of Vehicles refers to a large system network that performs wireless communication and information exchange, between the vehicle and an X (where X can refer to one or more of a car, a pedestrian, a roadside equipment, other vehicles, the Internet, etc.) according to the agreed communication protocol and data interaction standards. Communication through the Internet of Vehicles can enable vehicles to achieve driving safety, improve traffic efficiency, and achieve convenience or access entertainment information. Classified according to wireless communication objects, Internet of Vehicles communications include three different types: vehicle-to-vehicle communication (V2V), communication between vehicles and roadside equipment/network infrastructure (Vehicle-To-Infrastructure/Vehicle-to-Network (V2I/V2N for short), and Vehicle-to-Pedestrian (V2P), collectively referred to as V2X communication.

Figure 3:
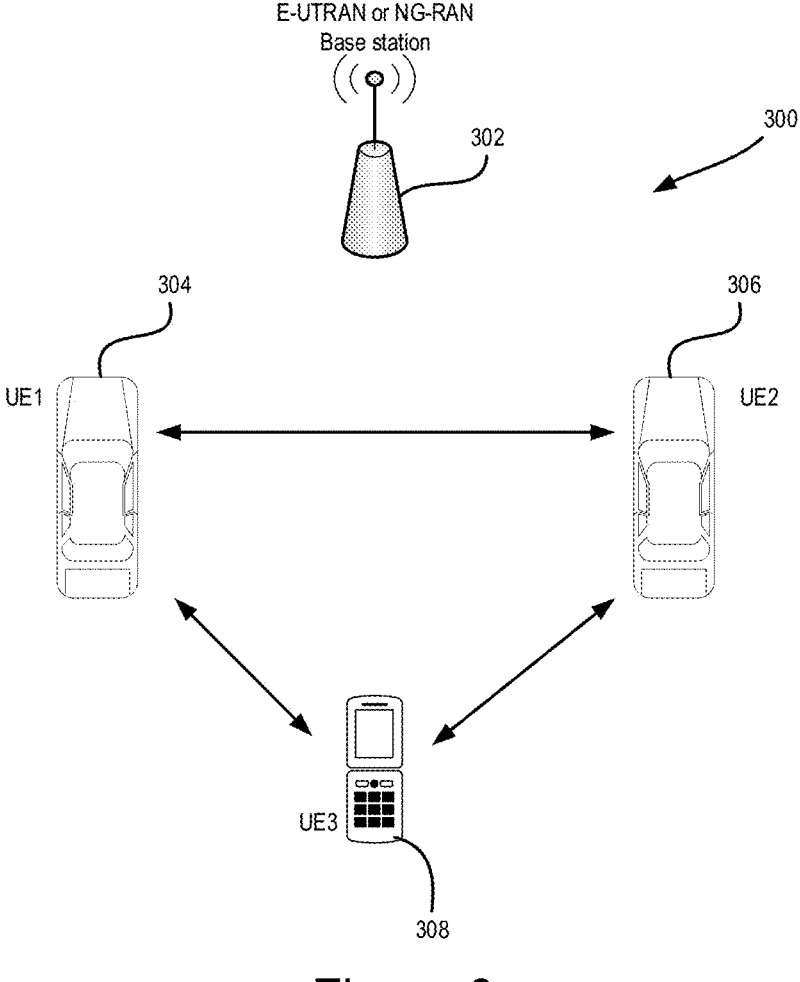
FIG. 3 shows an example V2X communication system, in accordance with some embodiments of the present disclosure.

In LTE (Long Term Evolution)-based V2X communication, direct-link/sidelink communication between UEs is not forwarded by the base station and the core network, but is instead directly transmitted by the source user equipment to the target user equipment through the air interface. This V2X communication method is referred to as PC5-based V2X communication or V2X sidelink communication, for short. FIG. 3 shows an example V2X communication system 300. The communication system 300 includes a first vehicle (UE1) 304, a second vehicle 306 (UE2), a mobile phone (UE3) 308, and a base station 302. The vehicles 304 and 306 and the mobile phone 308 can communicate directly with each other using PC5-based V2X communications.

First Aspect

NR V2X communication supports scheduling/allocation of cross RAT SL resources. The cross RAT SL resources scheduling includes: NR Uu controlling LTE SL resource scheduling, and LTE Uu controlling NR SL resource scheduling. In NR Uu controlling LTE SL scenarios, for example, a NR base station that supports LTE SL resource scheduling, and UE that supports both LTE SL and NR SL V2X communication, requests LTE SL resource configuration from the base station based on the Tx profile information. For example, assuming that the UE has R14 V2X service (data) to transmit, the UE determines the Tx profile (SL transmission format version) based on (1) a mapping relationship between the configured service type and the Tx profiles, and (2) the service type of the upper layer indication. In the Tx profile, there is an indication of the SL transmission format version (e.g., R14, R15, R16, R17, etc.). R14 indicates that the SL transmission uses the R14 transmission format, R15 indicates that the SL transmission uses the R15 transmission format, and so on. R14 and R15 are LTE-based V2X SL communications. The R14 transmission format is characterized in that the last symbol of the PSSCH transmission uses puncturing and uses the R14 MCS table. The R15 transmission format is characterized in that the last symbol of the PSSCH transmission uses rate-matching, uses R15 MCS table, and supports 64QAM. R16 and subsequent versions are NR-based V2X SL communications.

After the UE determines the Tx profile corresponding to the service type, if LTE RAT is selected, the UE determines the Tx profile corresponding to the destination L2 ID based on the configured mapping of the L2 IDs and service types for the LTE RAT. A destination identifier can include or refer to a destination L2 ID (sometimes referred to as destination L2 identifier, L2 identifier or L2 ID) and/or a destination index. The UE can then provide the destination L2 ID and the corresponding Tx profile indication to the access stratum layer (AS layer). If NR RAT is selected, the UE determines the Tx profile corresponding to the SL communication type and the destination L2 ID based on the mapping relationship between the destination L2 ID and the service type of the different communication types (SL broadcast/groupcast/unicast) configured for the NR RAT. The UE can then provide the SL communication type, destination L2 ID and corresponding Tx profile to the AS layer. (For NR RAT SL communication, any transmission format such as R16, R17, or R18 may be supported currently or in the future).

If the UE is currently connected to an NR base station (the NR base station includes the gNB or the ng-eNB), and the upper layer (indication) indicates that the data of the destination L2 ID is transmitted using the R14 or R15 format, the UE can request the NR base station to configure the LTE SL resource. For example, the UE can transmit the LTE sidelink UEInformation or the LTE UEAssistanceInformation, to the NR base station by using the NR RRC message. In response, the NR base station determines whether R14 or R15 format transmission is applicable/suitable for the destination L2 ID, and configures the LTE SL resource and the applicable transmission parameter (R14 format related transmission parameter, or transmission parameter associated with the R15 format). If the upper layer (indication) indicates that R16 (or R17/R18) format transmission is used for data of a certain destination identification destination L2 ID, the UE can request NR SL resource configuration from the NR base station. For example, the UE can send the NR sidelink UEInformation or NR UEAssistanceInformation message to the base station. After receiving the request, the NR base station can determine whether R16 or R17/R18 format transmission is applied for the destination L2 ID, and configures the NR SL resource and the applicable transmission parameters.

The NR base station determines which transmission format/Tx profile is used for the data of the destination L2 ID of a certain target identifier/destination L2 ID. In particular, the NR base station can utilize two possible approaches. In the first approach, The UE sends the Tx profile corresponding to the destination L2 ID to the base station, and this information is provided by the UE upper layer/V2X layer. Specifically, when the UE sends the LTE sidelink UEInformation or the NR sidelink UEInformation to the base station, the Tx profile corresponding to each destination L2 ID is included (or also sent).

In a second approach, The NR base station is configured with a mapping relationship table between the destination L2 ID and the Tx profile of the LTE RAT. The NR base station searches the mapping table by using the destination L2 ID in the received LTE sidelink UEInformation to determine the corresponding Tx profile/transmission format. Similarly, the NR base station is configured with a mapping relationship table between the destination L2 ID and the Tx profile of the NR RAT, and the NR base station searches the mapping table by using the destination L2 ID in the received NR sidelink UEInformation to determine the corresponding Tx profile/transmission format. For the NR RAT, a mapping relationship table between the destination L2 ID and the Tx profile (directed to the SL broadcast, groupcast, unicast) may be separately configured. The mapping relationship between the destination L2 ID and the Tx profile—used separately for LTE RAT and NR RAT and is saved/stored by the NR base station—are configured for the NR base station by the Policy Control Function (PCF) via the Access and Mobility Management Function (AMF). Specifically, the AMF may send, to the NR base station, a mapping relationship table that establishes a relationship between the destination L2 ID and the Tx profile used for LTE RAT and/or the NR RAT separately, through an NG interface message, such as, a NG SETUP RESPONSE message or a AMF CONFIGURATION UPDATE message.

Figure 4:
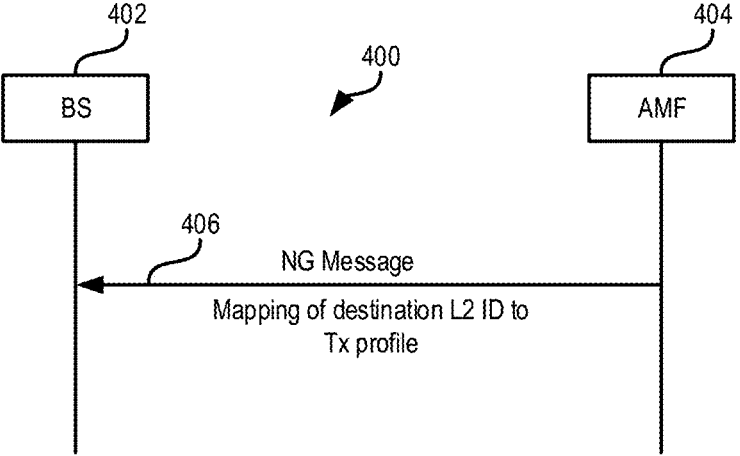
FIG. 4 shows a flow diagram for an example process for determining a transmission profile of a device, in accordance with an embodiment of the present disclosure.

FIG. 4 shows a flow diagram for an example process 400 for determining a transmission profile of a destination L2 ID of a device. In particular, FIG. 4 shows communication between a base station 402 and an AMF 404. The AMF can send a message 406, such as, an NG message, that includes mapping information between the destination L2 ID and the Tx profile for use in LTE V2X or for NR V2X sidelink communications.

Similarly, for LTE Uu control NR SL, in order for the LTE eNB to configure (for the UE) the NR SL resource and the transmission parameter corresponding to the appropriate transmission format, the eNB may obtain the mapping relationship table between the destination L2 ID and the Tx profile used for LTE RAT and/or the NR RAT separately. For NR RAT, the eNB can be separately configured with a mapping relationship table between the destination L2 ID and the Tx profile, specific to SL broadcast, groupcast, unicast. Specifically, the Mobility Management Entity (MME) sends a mapping relationship table between the destination L2 ID and the Tx profile used separately for the LTE RAT and/or the NR RAT, to the eNB through an S1 interface message, such as S1 SETUP RESPONSE, MME CONFIGURATION UPDATE.

Second Aspect

Figure 5:
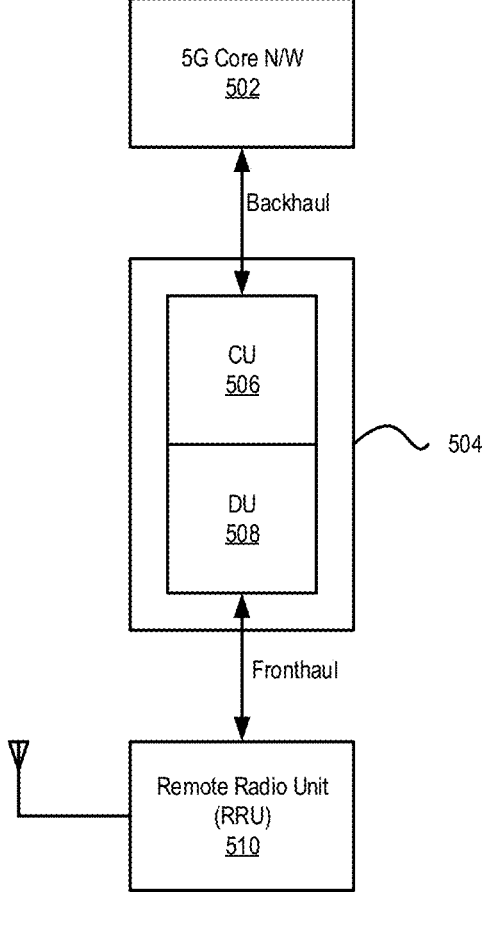
FIG. 5 shows a base station with a logical architecture that splits the base station into a central unit and a distributed unit, in accordance with an embodiment of the present disclosure.

In some instances, the base station can be split into a CU-DU configuration. For example, FIG. 5 shows a base station with a logical architecture that splits the base station 504 into a central unit 506 and a distributed unit 508. The base station 504 includes a backhaul connection from the base station 504 to the 5G core network 502 and a front-haul connection to a transmitter or a remote radio unit (RRU) 510. The DU is responsible for resource allocation and Radio Link Control (RLC)/MAC layer parameter configuration. Therefore, when the UE requests the SL communication resource for V2X SL communication, the DU needs to know whether the UE requests a LTE SL resource or a NR SL resource, and the transmission format applicable for each destination identification (destination L2 ID). The base station can take one of two approaches.

Figure 6:
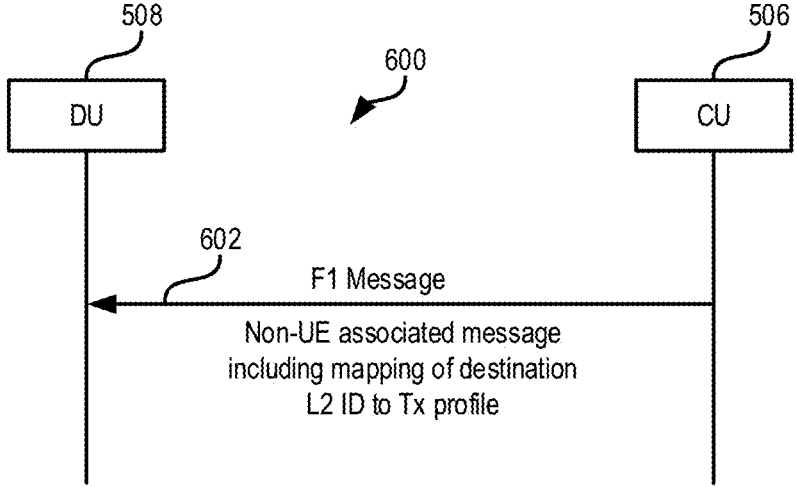
FIG. 6 shows a flow diagram of a first example process for communicating data between the CU and the DU of the base station, in accordance with an embodiment of the present disclosure.

In a first approach, the mapping relationship between the destination L2 ID and the Tx profile is obtained by the CU from/via AMF for the LTE RAT and/or the NR RAT respectively, via NG interface message. The CU then sends the received information to the DU, via an F1 interface message, for example, the F1 SETUP RESPONSE message and the CU CONFIGURATION UPDATE message. For example, FIG. 6 shows a flow diagram of a first example process 600 for communicating data between the CU and the DU of the base station. In particular, the CU can use non-UE associated F1 message (in step 602) including the mapping of destination L2 ID to Tx profile for LTE V2X or NR V2X to send to the DU, such as, the F1 SETUP RESPONSE message and the CU CONFIGURATION UPDATE message. After the CU receives the LTE or NR sidelink UEInformation sent by the UE, the CU sends the LTE/NR sidelink UEInformation (which includes information such as the destination L2 ID and the communication type/cast type (SL broadcast/groupcast/unicast)) to the DU, through CU to DU RRC Information. Based on the destination L2 ID and optionally cast type reported in the LTE/NR sidelink UEInformation, the DU searches for the mapping table particular to LTE or NR, to determine the Tx profile/transmission format corresponding to the destination L2 ID, and then configures the corresponding SL resource and the transmission configuration parameter associated with the transmission format.

Figure 7:
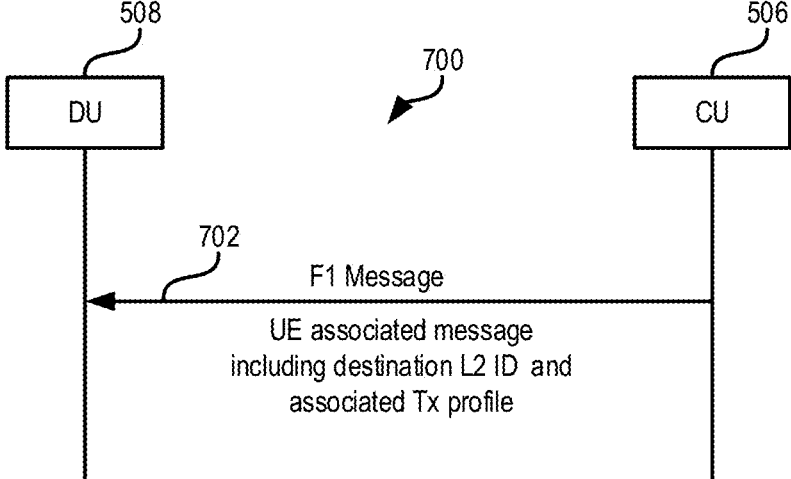
FIG. 7 shows a flow diagram of a second example communication between the CU and the DU of the base station, in accordance with an embodiment of the present disclosure.

In a second approach, the CU searches the mapping relationship between the destination L2 ID and the Tx profile, for LTE RAT or NR RAT, according to the destination L2 ID and optionally cast type in the LTE/NR sidelink UEInformation reported by the UE, and can determine the Tx Profile/transmission format corresponding to the destination L2 ID requested by the UE. The CU explicitly sends the Tx profile corresponding to the destination L2 ID (and cast type) requested by the UE, to the DU. For example, FIG. 7 shows a flow diagram of a second example process 700 showing communication between the CU and the DU of the base station. In particular, in step 702, the CU can use an F1 UE-associated message to send the destination L2 ID and the associated Tx profile for LTE V2X and/or NR V2X communication to the DU. The DU does not need to perform mapping by itself. Specifically, the CU sends, through/using F1 interface UE-associated messages, such as UE CONTEXT SETUP REQUEST or UE CONTEXT MODIFICATION REQUEST, to the DU the destination L2 ID(s) and its associated Tx profile(s), or destination index and its associated Tx profile(s) for LTE RAT and/or the destination L2 ID(s)/destination index and its associated Tx profile(s) for NR RAT. The destination L2 ID(s) is the destination L2 ID(s) included in the LTE/NR sidelink UEInformation, and the destination index is a sequence-serialized number corresponding to the destination L2 ID(s) included in the LTE/NR sidelinkUEInformation. The DU can determine, based on the destination index, the corresponding destination L2 ID(s) in LTE/NR sidelink UEInformation. The destination L2 ID(s)/destination index of the NR RAT and its corresponding Tx profile(s) respectively indicate the cast type corresponding to the destination L2 ID. Then, the corresponding SL resource and the transmission configuration parameter associated with the transmission format are configured.

Third Aspect

The network coverage or RRC state of the UE may change from time to time. A UE in different states obtains sidelink transmission resources and the Sidelink Radio Bearer (SLRB) configuration in different ways. For example, UE in RRC connected state acquires sidelink transmission resources and the SLRB configuration from a base station (e.g., a gNB) via dedicated signaling. The UE in RRC idle/inactive gets resources and the SLRB configuration from the System Information Block (SIB) configuration. An out of coverage UE can acquire this information from pre-configuration information. It can be challenging to handle the ongoing data transmission/SLRBs when UE's RRC state transitions (e.g. UE from RRC connected transitions to RRC idle/inactive/out of coverage or vice versa). When UE performs state transition, the mapping between PC5 QoS flow (the PC5 QoS flow can be represented by a PC5 QoS flow identifier (PFI) or a PC5 QoS profile (such as PQI, range and so on)) and SLRB should follow the SLRB configurations of the new UE state.

Figures 8, 9:
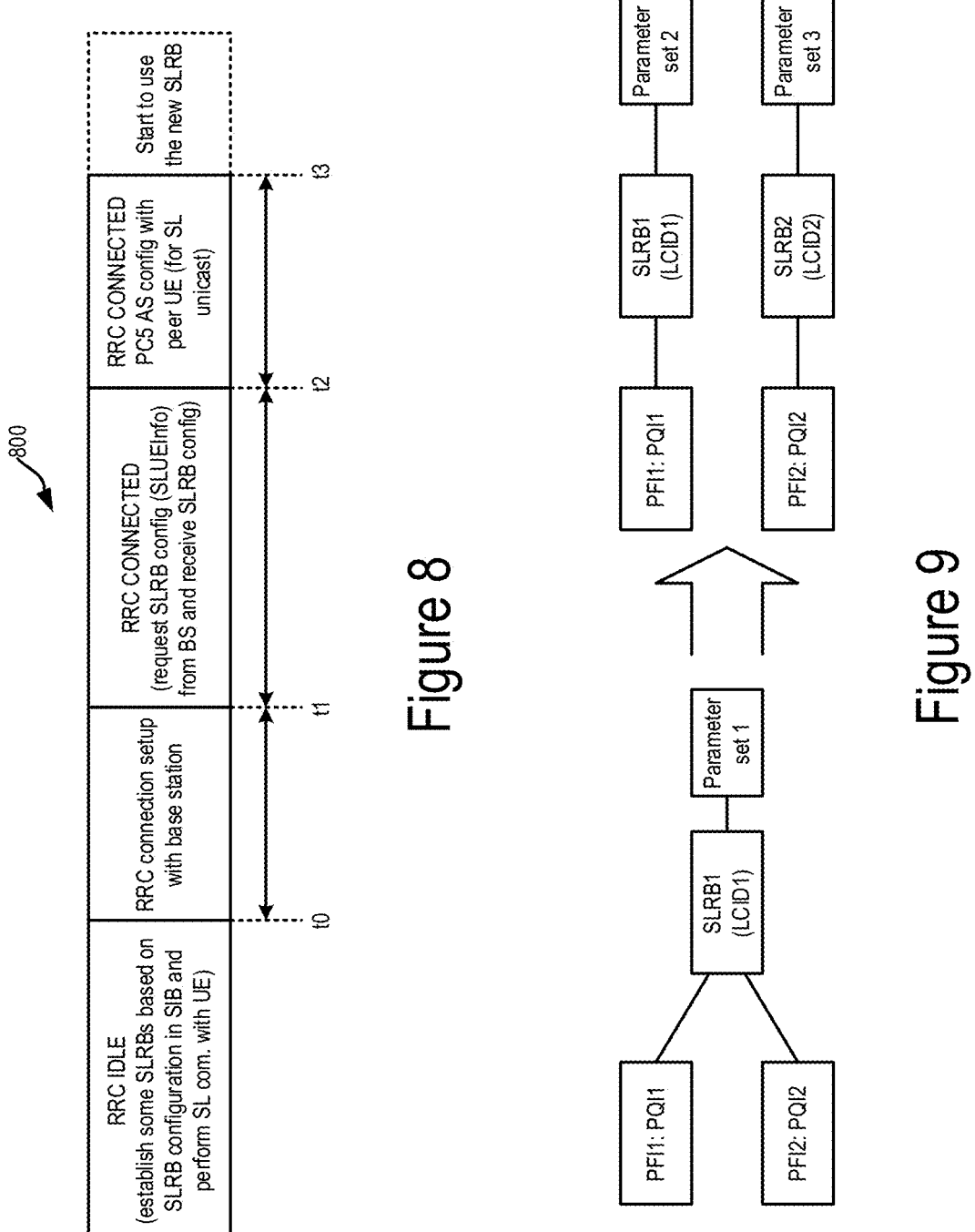
FIG. 8 shows a first timing diagram of RRC state transitions of a UE, in accordance with an embodiment of the present disclosure.
FIG. 9 shows an example of SLRB configuration collision, in accordance with an embodiment of the present disclosure.

Scenario 1: UE Transitions from an RRC Idle/Inactive/Out-of-Coverage State to RRC Connected State Suppose RRC idle/inactive UE has established several SLRBs based on SLRB configuration in SIB and uses SL resources configuration in SIB for SL data transmission. After a while, if the UE transitions into an RRC connected state, as in legacy (standards), UE should obtain SL transmission resources from the network via RRC dedicated signaling. In the meantime, UE should obtain and follow SLRB configuration from the network via RRC dedicated signaling. FIG. 8 shows a first timing diagram 800 of RRC state transitions of a UE. In particular, the timing diagram shows the transitions form an RRC IDLE state to an RRC Connected state. There is a time gap (between t0 to t2) before UE receives SLRB configuration from the network. If SLRBs established in RRC idle state based on SLRB configuration in SIB are released and UE is waiting for new SLRBs established based on SLRB configuration in RRC dedicated signaling, the ongoing SL data transmission might be interrupted. For SL unicast, the interruption time is even longer. Because UE should send the SLRB configuration (via PC5 AS configuration) to the peer UE after receiving the SLRB configuration in RRC dedicated signaling from NW and can only apply the SLRB configuration/new SLRBs after receiving PC5 AS configuration complete message from the peer UE.

Therefore, to ensure service continuity, it is beneficial to continue using the previously established SLRBs for ongoing data transmission before receiving SLRB configuration in RRC dedicated signaling when UE transits from RRC idle/inactive/Out of coverage to RRC connected state.

After setting up RRC connection with the BS, normally, the UE sends sidelink UEInformation including the PC5 QoS flow identifier (PFI) to the BS for SLRB configuration and SL resource allocation. However, without any information about the established SLRBs in previous state, SLRB configuration collision and packet loss may occur. For example, an old SLRB1 established in the RRC idle state carrying PFI 1 and PFI 2 is associated to LCID1 and configured with Packet Data Convergence Protocol (PDCP) SN1 while a new SLRB1 configured in RRC dedicated signaling carrying PFI 1 is associated with LCID1 and configured with PDCP SN2. This can result in a collision. That is, different configurations can correspond to the same LCID. Consequently, upon receiving the new SLRB1 configuration, the old SLRB1 should be released immediately and, if any, all the packets in the buffer of old SLRB1 would be discarded. In this case, packet loss could occur.

Thus, to avoid SLRB configuration collision and packet loss, the UE can report all the established SLRBs in previous state to the NW. Generally, besides the SLRB identifiers and QoS flow information mapped to the SLRB, the SLRB parameters of a SLRB that cannot be reconfigured can be reported to NW (e.g., the base station). Specifically, the reported information may include destination ID, cast type, QoS information of QoS flows mapped to each SLRB (identified by SLRB ID), logical channel identifier (LCID) and RLC mode of each SLRB, PDCP SN size, RLC SN length. In some examples, some Tx only parameters (LCH priority/PBR/BSD, polling related parameters, etc.) and Rx only SLRB parameters may not be reported to NW.

The BS, upon receiving the PC5 QoS profile(s) of QoS flow in sidelink UEInformation and information about established SLRBs in previous state from UE, can (re)configure SLRBs using one of two approaches discussed below. Basically, UE shall follow the PC5 QoS flow and SLRB mapping in the SLRB configuration of new UE state. The PC5 QoS flow and SLRB mapping in the new state may be the same as or different from previous state. FIG. 9 shows an example of SLRB configuration collision. As shown in FIG. 9, PFI 1 and PFI 2 are mapped to SLRB1 associated with parameter set-1 in RRC idle, however, when UE moves to RRC connected, PFI 2 may be configured to map to another SLRB (SLRB2) by BS.

First Approach: Continue Using Established SLRB(s) from Previous States

In this approach, the BS (e.g., a gNB) determines to continue to use the previously established SLRB (SLRB1/LCID1 to transmit QoS flow 1) but may reconfigure Tx only parameters for SL resource scheduling. In addition, if mode 1 resource is to be allocated, the BS can configure the corresponding logical channel group (LCG) for each of the SLRBs/LCIDs so that UE can report SL BSR (buffer status report) to the BS for sidelink resource allocation, the SR configuration associated to each logical channel and whether configured grant type1 is allowed to be used for each logical channel. Note that for SL unicast SLRBs, Radio Link Control (RLC) mode, PDCP SN size and RLC SN length may not be permitted to be reconfigured. For SL broadcast/groupcast, RLC mode, PDCP SN size and RLC SN length are default configured (i.e., configured to a specified fixed value). The BS can alternatively configure new SLRB, i.e. SLRB2 (LCID2), to transmit QoS flow 2. In this case, QoS flow 2 is remapped from SLRB1 to SLRB2. The principle/mechanism for in order delivery in case of QoS flow remapping can be used.

Second Approach: Configure to Establish New SLRBs Different from the Established SLRBs in Previous State In this approach, the BS configures to establish a new SLRB2 (LCID2) and SLRB3 (LCID3) to transmit QoS flow 1 and QoS flow 2 respectively. The new SLRBs are configured/assigned with SLRB IDs and LCIDs different from the SLRBs established in previous UE state. In this case, QoS flow 1 is remapped from SLRB1 (LCID1) to SLRB2

(LCID2) and QoS flow 2 is remapped from SLRB1 (LCID1) to SLRB3 (LCID3) (as shown in FIG. 9). The mechanism for in order delivery in case of QoS flow remapping can be used. The SLRB1 can be used continuously until the buffer is empty. Once buffer is empty, the SLRB1 can be released. In some instances, the first approach may be more efficient.

Scenario 2: UE Transitions from an RRC Connected State to RRC Idle/Inactive/Out-of-Coverage State When UE moves from RRC connected state to an RRC idle/inactive/out of coverage state, the UE may not use the SL resource configured by the NW via the RRC dedicated signaling any more. Instead the UE can use the SL configuration in V2X SIB. For SLRB configuration, as previous agreement, the mapping between the QoS profile and the SLRB can follow the SLRB configuration in the new state (V2X SIB/pre-configuration). In NR Uu, the V2X SIB, as other SIBs, may be not broadcasted, and thus the UE can acquire the V2X SIB from the RRC reconfiguration or apply an on demand SI procedure.

If the V2X SIB is not broadcasted periodically, the UE in the RRC connected state can obtain the V2X SIB from the RRC reconfiguration to perform SL communication. Subsequently, when the UE transitions from the RRC connected to the RRC idle/inactive state, the UE can use the stored V2X SIB, which was obtained in the RRC connected state.

Figures 10, 11:
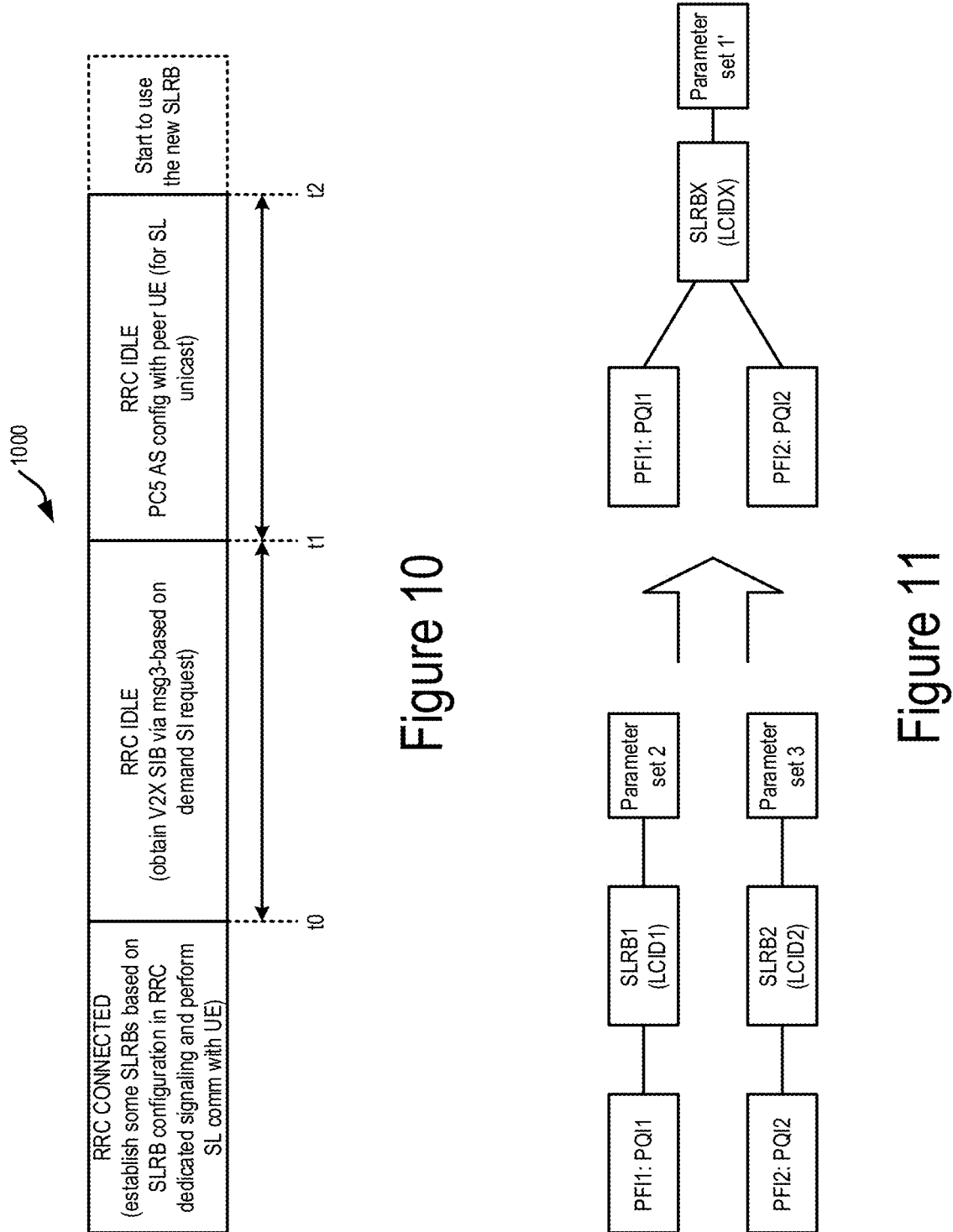
FIG. 10 shows an example timing diagram of RRC state transitions of a UE, in accordance with an embodiment of the present disclosure.
FIG. 11 shows an example of SLRB configuration in different RRC states of the UE, in accordance with an embodiment of the present disclosure.

In instances when the UE transitions from the RRC connected state to the RRC idle/inactive state, the V2X SIB is not broadcasted and the stored V2X SIB is not valid. In such instances, the UE can acquire the V2X SIB by msg1- or msg3-based on demand SI request procedure. If the SLRBs established in the RRC connected state are abandoned and the UE is waiting for new SLRBs established based on SIB, the ongoing data transmission may be interrupted. FIG. 10 shows an example timing diagram 1000 of RRC state transitions of a UE. In particular, the second example timing diagram 1000 shows the transitions from an RRC connected state to an RRC idle state. In some instances, if the SLRBs are established in the RRC connected state, as mentioned above, the ongoing data transmission may be interrupted during the period t0-t1. For SL unicast, the interruption time is even longer (t0-t2). Because UE should send the SLRB configuration (via PC5 AS configuration) to the peer UE after obtaining the SLRB configuration in V2X SIB/preconfiguration and can only apply the SLRB configuration/new SLRBs after receiving PC5 AS configuration complete message from the peer UE. Therefore, to ensure service continuity, it is beneficial to continue using the previously established SLRBs for ongoing data transmission before obtaining SLRB configuration in V2X SIB or before establishment of new SLRBs in new state when UE transits from the RRC connected state to the RRC idle/inactive/Out of coverage state.

When obtaining the SLRB configuration from the V2X SIB/pre-configuration, the UE can at least follow the QoS flow to the SLRB mapping in SIB. FIG. 11 shows an example of SLRB configuration in different RRC states of the UE. In particular, FIG. 11 shows the established SLRBs in RRC connected state and SLRB configuration in V2X SIB/pre-configuration when UE moves from RRC connected state to RRC idle/inactive/Out of coverage.

With regard to the SLRB in the new state, the BS can take one of two approaches discussed below.

First Approach: Continue Using the Established SLRBs from the Previous State

In this approach, the UE can continue to use SLRB1 (LCID1) or SLRB2(LCID2) to transmit packets of both PQI 1 and PQI 2. That is, the UE assigns SLRB1(LCID1) or SLRB2(LCID2) to the SLRB(SLRB X/LCID X) mapped with PQI 1 and PQI 2. For the SLRB configuration in the SIB/pre-configuration, the SLRB ID and the LCID can be assigned by the UE itself.

The first approach can be always applicable for SL broadcast/groupcast because the PDCP SN size/RLC SN length/RLC mode are specified as a fixed value (i.e. which is not changed when UE state transitions). It is applicable for SL unicast only if the PDCP SN size/RLC SN length/RLC mode of the SLRB X are the same as the SLRB1 or the SLRB2. In instances where the PDCP SN size/RLC SN length/RLC mode of the SLRB X are different from SLRB1 and SLRB2, if SLRB1(LCID1) or SLRB2(LCID2) is assigned for SLRB X, packet loss may occur. Because when new the SLRB1 is established based on the new configuration, the old SLRB1 can be released immediately and, if any, all the packets in the buffer of old SLRB1 may be discarded. Other SLRB parameters (e.g. PDCP discard timer, LCH priority/PBR/BSD, polling related parameters) can follow the new configuration in SIB/pre-configuration, (i.e. the SLRB is reconfigured).

Second Approach: Establish New SLRBs Different from Established SLRBs in Previous State In this approach, the SLRB X is assigned to a new SLRB ID and LCID, e.g. SLRB3(LCID3) which is different from SLRB1(LCID1) and SLRB2(LCID2). In this case, the QoS flow 1/PQI 1 is remapped from SLRB1(LCID1) to SLRB3 (LCID3) and QoS flow 2/PQI 2 is remapped from SLRB2 (LCID2) to SLRB3(LCID3). In some examples, the mechanism for in order delivery in case of QoS flow remapping can be used. SLRB1 and SLRB2 can be used continuously and released until the associated buffer is empty.

In some instances, SLRBs established in previous state can be continued with as far as possible, especially for SL broadcast/groupcast. If the SLRB configuration and packet loss occur when using established SLRBs in previous state (for SL unicast), the second approach can be used (i.e. new SLRBs are established).

Scenario 3: UE Transitions Between RRC Out-of-Coverage and RRC Idle States

When the UE in the RRC out-of-coverage state transitions into the RRC idle state, the UE can obtain the V2X SIB at the outset. As discussed above, the V2X SIB may be not broadcasted, thus the UE may have to apply msg 1- or msg 3-based on demand SI procedure to obtain the V2X SIB. To ensure service continuity, it can be beneficial to continue using the previously established SLRBs for ongoing data transmission before obtaining the SLRB configuration in the V2X SIB or before establishment of new SLRBs in the new state when UE transitions from the RRC out-of-coverage state to the RRC idle state.

In instances where the UE established the SLRB1 (LCID1) to transmit PFI1(PQI1) and PFI2(PQI2) with associated parameter set-1 pre-configured for out of coverage scenario, and when the UE transitions into the RRC idle state, based on the V2X SIB, PQI1 is mapped to a SLRB with parameter set 2 while PQI2 is mapped to an SLRB with parameter set-3 (see, e.g., FIG. 11). Again, there can be two approaches taken for SLRBs in the new state as discussed above, i.e. the first approach can be to continue using established SLRBs as far as possible and the second approach can be to establish new SLRBs different from previously established SLRBs.

In some instances, the SLRBs established in the previous state can be continued with as far as possible, especially for SL broadcast/groupcast. If the SLRB configuration and packet loss occur when using the established SLRBs in previous state (for SL unicast), the second approach can be used (i.e. new SLRBs are established). The same consideration can be applied to the scenarios where the UE in RRC idle/inactive state transition into the RRC out-of-coverage state.

Fourth Aspect

In some instances, the UE1 can be in an RRC connected state and acquire the SLRB configuration from the BS. The BS sends the SLRB configuration to the UE1 via the RRC reconfiguration. Upon receiving the SLRB configuration, for SL unicast communication, the UE1 sends SLRB configuration (only includes both Tx and Rx related SLRB parameters) via PC5 AS configuration message to the peer UE2. The UE2 may reject/fail to establish new SLRBs and thus can send a PC5 AS configuration failure message to the UE1. If UE1 receives a PC5 AS configuration failure message from UE2 or if UE1 receives no responsive message from UE2, UE1 can determine that the PC5 AS configuration has failed. In such instances, the challenge is whether the UE1 needs to inform the BS about the failure and how to implement communicating the failure to the BS.

In NR Uu, upon receiving the RRC reconfiguration message from gNB, if the UE is unable to comply with (at least a part of) the configuration, the UE can initiate the RRC connection re-establishment procedure. The UE may have ongoing data transmission over NR Uu and SL communication with other UEs. In such instances, it may not be appropriate to initiate the RRC re-establishment if some of the SLRB configuration has failed.

Figure 12:
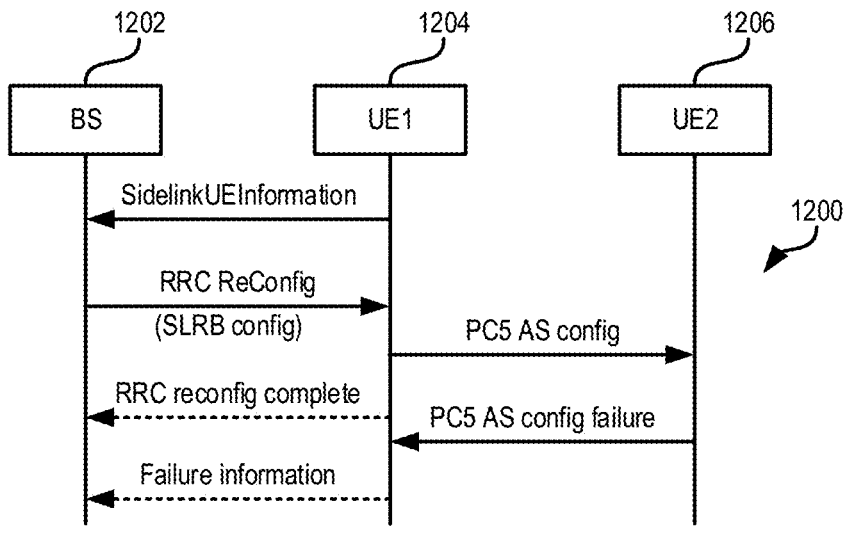
FIG. 12 shows a flow diagram of a first example process for reporting configuration failure to the BS, in accordance with an embodiment of the present disclosure.

In NR Uu, FailureInformation message can be used to inform the network about a failure detected by UE. In addition, the SLRB configuration failure at UE can also be reported to the network via the FailureInformation message. In this case, RRC reconfiguration procedure can be independent from PC5 AS configuration. Specifically, upon receiving the RRC reconfiguration from the BS, if the UE1 is able to comply with all configuration except for SLRB configuration for SL unicast, the UE1 sends the RRC configuration complete message to the BS. After that, if (some of) PC5 AS configuration failure occurs, the UE1 sends FailureInformation message to inform the SL failure to the BS. The failure information may include the SLRB identity and/or logical channel identity of a specific destination L2 ID, cast type of the destination L2 ID, failure type of SL. The failure type indicates the failure is about sidelink. FIG. 12 shows a flow diagram of a first example process 1200 for reporting configuration failure to the BS. In the first example, the UE 1 (1204) sends FailureInformation message to inform the BS (1202) of the SL failure received from the UE 2 (1206).

Figure 13:
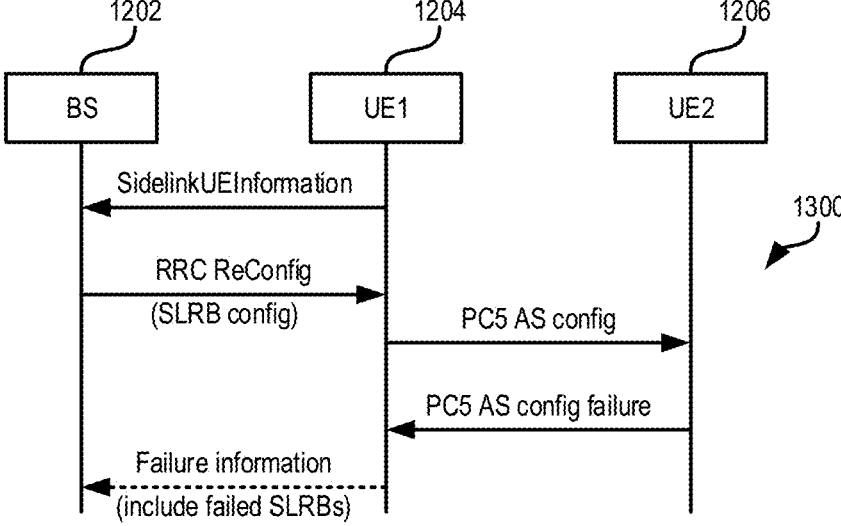
FIG. 13 shows a flow diagram of a second example process for reporting configuration failure to the BS, in accordance with an embodiment of the present disclosure.

Alternatively, the RRC reconfiguration complete message can be enhanced to report SLRB configuration failure at UE to network. To be specific, if (some of) PC5 AS configuration failure occurs, the UE1 informs the failure via RRC reconfiguration complete message. The failure information may include at least one of the destination L2 ID (belonging which the SLRB fails to establish), the SLRB identity (that failed to establish), the logical channel identity (that failed to establish), cast type of the destination L2 ID and the failure type (indicates the failure is about sidelink). FIG. 13 shows a flow diagram of a second example process 1300 for reporting configuration failure to the BS. In the second example, the UE 1 sends failure information in the RRC reconfiguration complete message to the BS. In addition, the UE 1 can include additional failure information such as the destination L2 ID, the SLRB identity, the logical channel identity, cast type and the failure type.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
determining, by a wireless communication node, an indication of a version of a sidelink transmission format, for configuring (i) a sidelink resource and (ii) at least one transmission configuration parameter for a sidelink transmission of a wireless communication device, by:
receiving, by a central unit of the wireless communication node, a mapping relationship table from an access and mobility management function (AMF), and a destination identifier from a wireless communication device; and determining, by the central unit or a distribution unit of the wireless communication node, the indication using the mapping relationship table and the destination identifier; and configuring, by the wireless communication node according to the indication of the version of the sidelink transmission format, (i) the sidelink resource and (ii) the at least one transmission configuration parameter for the sidelink transmission of the wireless communication device.

2. The method of claim 1, comprising determining the indication by receiving, by the wireless communication node, the indication from the wireless communication device.

3. The method of claim 1, comprising:

receiving, by the wireless communication node, at least one of the destination identifier and a cast type from the wireless communication device.

4. The method of claim 1, comprising determining the indication by:

sending, by the central unit to the distribution unit of the wireless communication node, the mapping relationship table and the destination identifier; and determining, by the distribution unit, the indication using the mapping relationship table and the destination identifier.

5. The method of claim 1, comprising determining the indication by:

determining, by the central unit, the indication using the mapping relationship table and the destination identifier; and sending, by the central unit to the distribution unit of the wireless communication node, the indication determined using the destination identifier.

6. The method of claim 1, comprising receiving, by the wireless communication node from a network entity, at least one of a mapping relationship table for a long term evolution (LTE) radio access technology (RAT) or a mapping relationship table for a new radio (NR) RAT.

7. The method of claim 5, further comprising sending, by the central unit to the distribution unit, the destination identifier.

8. The method of claim 4, comprising:

configuring, by the distribution unit according to the indication, the sidelink resource and the at least one transmission configuration parameter for the sidelink transmission of the wireless communication device.

9. The method of claim 3, wherein the mapping relationship table includes a mapping between the destination identifier and the indication.

10. The method of claim 3, wherein when the mapping relationship table is for a new radio (NR) RAT, the mapping relationship table is configured for sidelink broadcast, groupcast or unicast.

11. A wireless communication node, comprising:

at least one processor configured to:

determine an indication of a version of a sidelink transmission format, to configure (i) a sidelink resource and (ii) at least one transmission configuration parameter for a sidelink transmission of a wireless communication device, by:

receiving, by a central unit of the wireless communication node, a mapping relationship table from an access and mobility management function (AMF), and a destination identifier from a wireless communication device; and determining, by the central unit or a distribution unit of the wireless communication node, the indication using the mapping relationship table and the destination identifier; and configure, according to the indication of the version of the sidelink transmission format, (i) the sidelink resource and (ii) the at least one transmission configuration parameter for the sidelink transmission of the wireless communication device.

12. The wireless communication node of claim 11, wherein the at least one processor is configured to determine the indication by receiving, via a receiver, the indication from the wireless communication device.

13. The wireless communication node of claim 11, wherein the at least one processor is configured to:

receive, via a receiver, at least one of the destination identifier and a cast type from the wireless communication device.

14. The wireless communication node of claim 11, wherein the at least one processor is configured to determine the indication by:

sending, via the central unit to the distribution unit of the wireless communication node, the mapping relationship table and the destination identifier; and determining, via the distribution unit, the indication using the mapping relationship table and the destination identifier.

15. The wireless communication node of claim 11, wherein the at least one processor is configured to determine the indication by:

determining, via the central unit, the indication using the mapping relationship table and the destination identifier; and sending, via the central unit to the distribution unit of the wireless communication node, the indication determined using the destination identifier.

16. The wireless communication node of claim 11, wherein the at least one processor is configured to receive, via a receiver from a network entity, at least one of a mapping relationship table for a long term evolution (LTE) radio access technology (RAT) or a mapping relationship table for a new radio (NR) RAT.

17. The wireless communication node of claim 15, wherein the at least one processor is configured to send, via the central unit to the distribution unit, the destination identifier.

18. The wireless communication node of claim 14, wherein the at least one processor is configured to:

configure, via the distribution unit according to the indication, the sidelink resource and the at least one transmission configuration parameter for the sidelink transmission of the wireless communication device.

19. The wireless communication node of claim 13, wherein the mapping relationship table includes a mapping between the destination identifier and the indication.

20. The wireless communication node of claim 13, wherein when the mapping relationship table is for a new radio (NR) RAT, the mapping relationship table is configured for sidelink broadcast, groupcast or unicast.

* * * * *